(12) United States Patent
Jo et al.

(10) Patent No.: US 6,810,250 B2
(45) Date of Patent: Oct. 26, 2004

(54) METHOD OF GLOBAL ROAMING SERVICES USING GATEWAY LOCATION REGISTER IN THIRD GENERATION MOBILE TELECOMMUNICATION NETWORKS

(75) Inventors: Jin Mahn Jo, Daejeon-shi (KR); Sang Woo Woo, Kyoungki-do (KR); Eun Hee Kwon, Kyoungki-do (KR)

(73) Assignee: Korea Telecommunication Authority, Kyunggi-Do (KR)

( * ) Notice: Subject to any disclaimer, the term of this patent is extended or adjusted under 35 U.S.C. 154(b) by 572 days.

(21) Appl. No.: 09/736,082

(22) Filed: Dec. 13, 2000

(65) Prior Publication Data

US 2002/0061746 A1 May 23, 2002

(30) Foreign Application Priority Data

Nov. 23, 2000 (KR) ........................................ 2000-70045

(51) Int. Cl.[7] ................................................ H04Q 7/20
(52) U.S. Cl. ................ 455/433; 455/432.1; 455/432.2; 455/432.3
(58) Field of Search ............................. 455/433, 435.1, 455/435.2, 432.1, 432.2, 429.1, 432.3, 418–420, 422.1, 445, 461

(56) References Cited

U.S. PATENT DOCUMENTS

| | | | | |
|---|---|---|---|---|
| 5,467,381 A | * | 11/1995 | Peltonen et al. .............. | 379/58 |
| 5,878,397 A | * | 3/1999 | Stille et al. ................ | 704/466 |
| 5,956,640 A | * | 9/1999 | Eaton et al. ................ | 455/432 |
| 6,002,931 A | * | 12/1999 | Yamaguchi et al. ......... | 455/433 |
| 6,131,116 A | * | 10/2000 | Riggins et al. ............. | 709/219 |
| 6,137,791 A | * | 10/2000 | Frid et al. ................... | 370/352 |
| 6,230,005 B1 | * | 5/2001 | Le et al. ..................... | 455/414 |
| 6,535,737 B1 | * | 3/2003 | Karlsson ..................... | 455/434 |
| 6,611,685 B1 | * | 8/2003 | Rune et al. ................. | 455/433 |

* cited by examiner

Primary Examiner—William Trost
Assistant Examiner—Meless Zewdu
(74) Attorney, Agent, or Firm—Merchant & Gould, P.C.

(57) ABSTRACT

The invention provides a method of roaming services for global roaming subscribers in the third generation mobile telecommunication networks in which a visitor network GLR(Gateway Location Register) is connected to a home network GLR so that the home network GLR can download subscriber information from HLR(Home network Location Register) to the visitor network GLR. In this manner, the visitor network GLR is blocked from direct contact to the home network HLR in the roaming service about the terminal moved to other network and downloaded with the subscriber information stored in the home network HLR in which the terminal is registered via the GLR so that the subscriber information stored in the home network HLR can be prevented from being exposed by the visitor network GLR. The visitor network GLR is associated with the home network GLR only in contrast to conventional association with all HLR of the home network so that a signal track can be remarkably reduced. Furthermore, the visitor network GLR can be downloaded with programs for various application or intelligent network services provided in the home network so that the terminal can be provided with the same services in the visitor network as in the home network.

16 Claims, 7 Drawing Sheets

METHOD OF GLOBAL ROAMING SERVICES USING GATEWAY LOCATION REGISTER IN THIRD GENERATION MOBILE TELECOMMUNICATION NETWORKS

BACKGROUND OF THE INVENTION

1. Field of the Invention

The invention relates to a method of a global roaming service for global roaming service subscribers in third generation mobile telecommunication (IMT-2000) networks, and in particular a method of global roaming services which performs a roaming for global roaming subscribers with a VLR(Visitor Location Register)—GLR (Gateway Location Register)—GLR—HLR(Home network Location Register) structure between home and visitor networks, provides an environment for application services provided by the home network to be used from the visitor network, and allows the subscribers to change additional service information stored in the HLR of the home networks from the visitor networks as well while concentrically managing local subscribers who moved to visitor networks and oversees subscribers entered from other networks.

2. Description of the Related Art

In the currently provided roaming services in a plurality of third generation mobile telecommunication networks such as IMT-2000 networks which are operated by different service providers, when a terminal is moved from the home network (i.e., the network of a service provider with whom the terminal owner has made a service contract) to a visitor network (i.e., a network of a service provider having a service area where the terminal owner is currently located in the roaming), the visitor network acquires location information of the moved terminal from the home network for performing phone call service on the terminal based upon the acquired location information.

Figure 1:
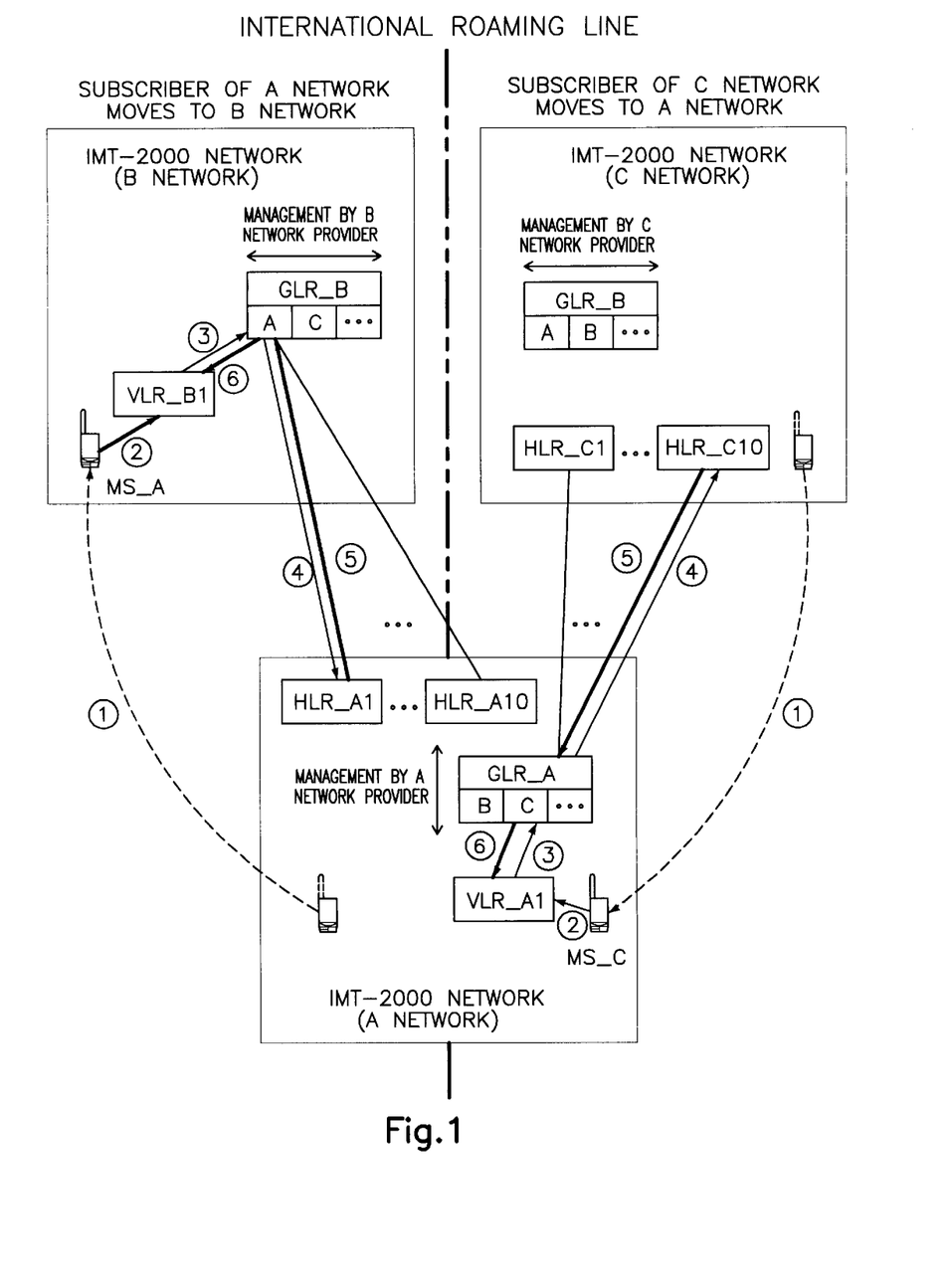
FIG. 1 shows a signal flow according to the roaming service between the third generation mobile telecommunication networks of the related art.

FIG. 1 shows a signal flow according to the roaming service between the third generation mobile telecommunication networks of the related art, in which a terminal MS_A has the home network A and a terminal MS_C has the home network C. Here, the terminal MS_C moves to the network A and the terminal MS_A moves to network B.

First, when the terminal MS_A moves from the home network A to the B network as a visitor network as indicated with ①, the moved terminal MS_A transmits a location register message to a VLR_B1 as indicated with ②, and the VLR_B1 stores the location register message to an area A of a GLR_B as indicated with ③.

Then, the GLR_B receives IMSI(Intentional Mobile Subscriber ID) parameters from the location register message registered in the area A, and interprets MCCs(Mobile Country Codes) within the parameters to recognize that the terminal MS_A is moved from the network A.

And then, the GLR_B confirms an HLR ID where subscriber information of the terminal MS_A is stored based upon subscriber number thereof, and if the detected HLR ID is "HLR_A1" for example, requests the HLR_A1 to transmit packet subscriber information and line subscriber information as indicated with ④.

When the HLR_A1 transmits the packet subscriber information and line subscriber information of the terminal MS_A to the GLR_B as indicated with ⑤ on the foregoing request, the GLR_B stores the packet subscriber information and line subscriber information to "A" area and then transmits the corresponding packet subscriber information and line subscriber information to the VLR_B1 for storage as indicated with ⑥.

The terminal MS_A roamed via the foregoing process has the packet subscriber information and line subscriber information stored in the registered VLR_B1 so that the terminal MS_A can be provided with a normal phone call service in the visitor network (network B) after that.

In particular, to perform the foregoing operations, a GLR comprised in one third generation mobile telecommunication network is associated with all HLRs comprised in other third generation mobile telecommunication networks for providing a roaming service so that the GLR is downloaded with the subscriber information from the HLR in the home network of the roamed subscriber.

However, the foregoing method for providing roaming services has problems in that signal traffic is complicated since the GLR of one third generation telecommunication network should be associated with the HLRs of all mobile telecommunication networks that can be roamed, and the subscriber information stored in the HLR of the home network can be exposed incurring security problems because all the HLRs of the home network are opened by the GLR of other networks established in the visitor network.

Also, in the first roaming to the visitor network, the GLR of the visitor network is required to be processed in order to detect the HLR stored with the subscriber information of the roaming terminal from the plurality of HLRs comprised in the home network of the roaming terminal for the first location register procedure and first subscriber information download regarding the roaming terminal. Furthermore, when the visitor network and home network are established with different next generation mobile telecommunication network systems, the visitor network GLR and the home network HLR should have an MAP(Mobile Application Part) conversion. When the visitor network GLR does not have MAP conversion protocols, an IWF(Inter Working Function) is required between the GLR and HLR.

SUMMARY OF THE INVENTION

The invention is proposed to solve the foregoing problems of the related art, and it is therefore an object of the invention to provide a method of roaming services for global roaming subscribers in third generation mobile telecommunication networks, in which information stored in a HLR can be downloaded to a visitor network GLR via a home network GLR of a roamed terminal when the terminal is moved into the visitor network.

Also, it is another object of the invention to provide a method of roaming services in which a USSD(Unstructured Supplementary Service Data) handler is downloaded to the visitor network GLR so that the roamed terminal can be provided with the same application services in the visitor network as in the home network, and additional service information stored in the home network HLR can be changed in the visitor network also when MMI(Man Machine Interface) commands including service codes, i.e., codes for discriminating services and service information, i.e., service information desired to be changed are directly inputted from the corresponding terminal so that the subscribers can change their additional service information everywhere.

To obtain the foregoing objects of the invention, there is provided a method of roaming services for global roaming subscribers in third generation mobile telecommunication networks having a GLR(Gateway Location Register), HLR (Home network Location Register) and VLR(Visitor Location Register) in which the GLR is stored with subscriber information about a terminal, which is roamed from the home network to a visitor network, to provide the roamed terminal with the same services in the visitor network as in the home network, wherein upon transmitting in the roamed terminal a location register message, the GLR of the visitor network requests location register and the subscriber information download to the HLR of the home network via the GLR of the home network; and is downloaded with the subscriber information stored in the home network HLR to manage the roamed terminal.

To obtain the foregoing objects of the invention, there is provided another method of roaming services for global roaming subscribers in third generation mobile telecommunication networks having a GLR, HLR and VLR in which the GLR and VLR are stored with subscriber information about a terminal, which is roamed from the home network to a visitor network, to provide the roamed terminal with same services in the visitor network as in the home network, the method comprising the steps of: inputting in the roaming completed terminal an MMI command according to additional service changes to transmit the command via the GLR of the visitor network to the GLR of the home network; changing in the home network GLR additional service information stored in the HLR of the home network in response to the MMI command; transmitting in the HLR the changed additional service information to the home network GLR; storing in the home network GLR and transmitting the additional service information to the visitor network GLR; and storing in the visitor network GLR and transmitting the additional service information to the VLR where the roamed terminal is currently registered, whereby the roamed terminal can change the additional service information stored in the home network HLR.

To obtain the foregoing objects of the invention, there is provided further method of roaming services for global roaming subscribers in third generation mobile telecommunication networks having a GLR, HLR and VLR in which the GLR and VLR are stored with subscriber information about a terminal, which is roamed from the home network to a visitor network, to provide the roamed terminal with same services in the visitor network as in the home network, wherein programs for supporting application services or intelligent network services provided in the home network are downloaded to the GLR of the visitor network via the GLR of the home network, whereby the roaming completed terminal can be provided with application services or intelligent network services according to the operation of the downloaded programs in the visitor network as well.

BRIEF DESCRIPTION OF THE DRAWINGS

Hereinafter, preferred embodiments of the invention will be described in detail in reference to the accompanying drawings, wherein.

DETAILED DESCRIPTION OF THE PREFERRED EMBODIMENT

Figure 2:
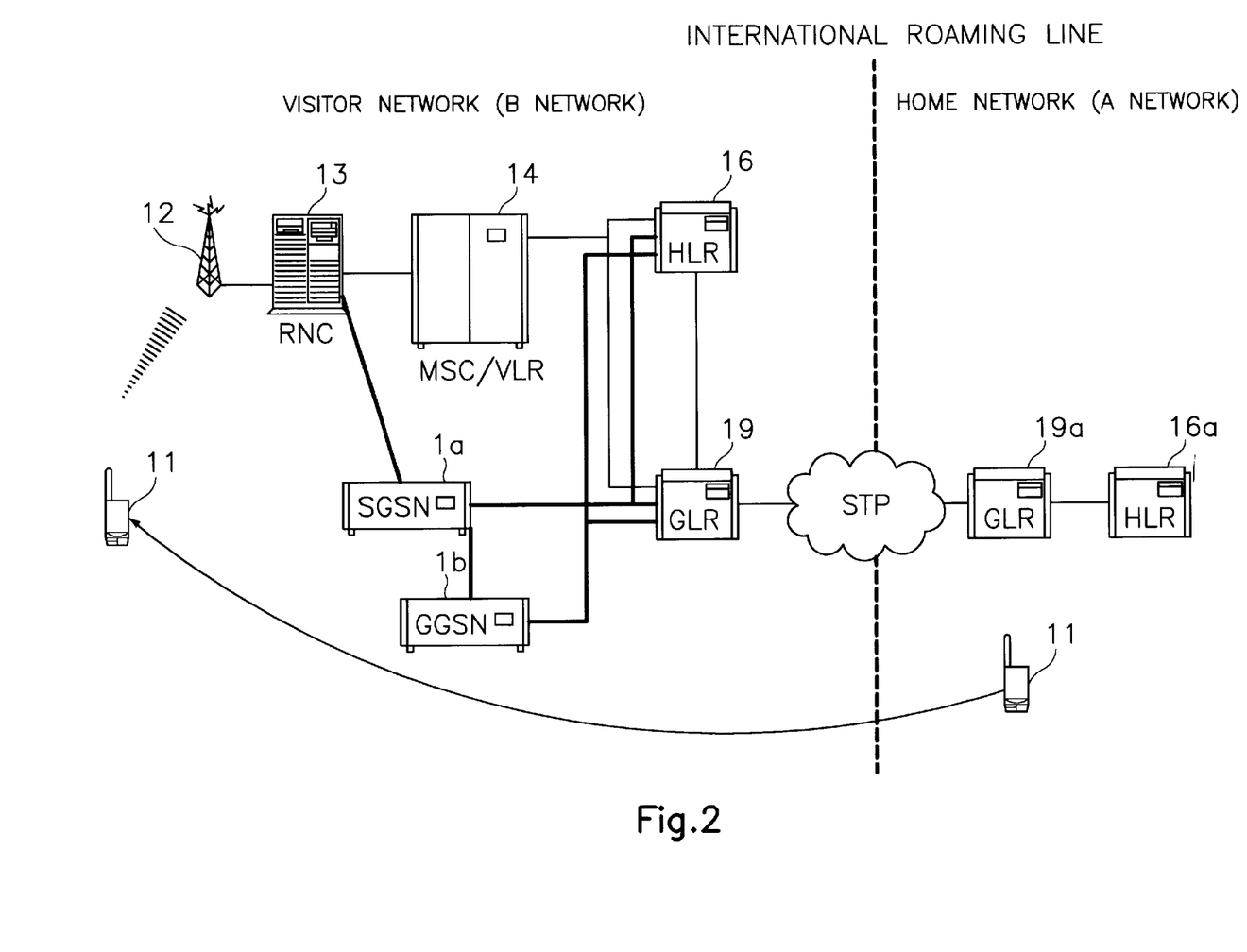
FIG. 2 is a schematic structural view of an third generation mobile telecommunication network for a global roaming according to the invention.

FIG. 2 is a schematic structural view of an third generation mobile telecommunication network for a global roaming according to the invention.

As shown in FIG. 2, the third generation mobile telecommunication network comprises GLRs 19 and 19a, HLRs 16 and 16a, a MSC(Mobile Switching Center) VLR 14, SGSN (Serving GPRS Support Node) 1a, GGSN(Gateway GPRS Support Node) 1b, and RNC(Radio Network Controller) 13, etc.

To be more precise, thinner lines are for transmitting line information and thicker lines are for transmitting packet information.

Here, the GLR 19 manages several VLRs in a visitor network (network B), stores service profile information of a roaming subscriber downloaded from the HLR 16a of a home network (network A), and manages real time location information of a roamed terminal.

Also, the GLR 19 is located between the HLR 16 and the VLR 14 (or the SGSN 1a) to exchange MAP(Mobile Application Part) operations with the HLR 16 and the VLR 14 (or the SGSN 1a).

Therefore, the GLR 19 generates GLR address and GMSC(Gateway Mobile Service Switching Center) address based upon VLR number, SGSN number and MSC address of the visitor network B where the roamed terminal is currently located which are transmitted from the VLR 14 (or SGSN 1a), and transmits the generated addresses to the GLR 19a of the home network A.

In particular, according to the invention, the GLR 19 has discriminated areas such as an area for storing information about local subscribers who moved out of the network B, and the other area for storing information about subscribers roamed from other networks associated to provide roaming service at present.

The SGSN 1a manages routing information and routing area ID and does a bearer control for packet data transmission in a core network, an authentication and access control.

The GGSN 1b is a repeater for interworking with external packet switching networks or relaying between third generation mobile telecommunication packet data networks and the external internet or between packet data networks such as X.25, which can use routing information and routing area ID stored in the SGSN 1a to route and relay packets.

The RNC 13 collects signal information from various base stations managed thereby, and transmits circuit signal information to the MSC/VLR 14 and packet signal information to the SGSN 1a.

Hereinafter, a signal flow of roaming services for global roaming subscribers according to an embodiment of the invention will be described in reference to FIG. 3.

First, when the terminal MS_A is moved from the home network A to the visitor network B as indicated with ①, the moved terminal MS_A transmits location register message to the VLR_B1 14 as indicated with ②, and the VLR_B1 stores the location register message in an area A of the GLR_B 19 as indicated with ③.

Then, the GLR_B 19 interprets an MCC in IMSI parameters to recognize that the terminal MS_A is the one moved from the area A. After that, the GLR_B 19 requests the home network GLR_A 19a of the terminal MS_A to transmit packet subscriber information and line subscriber information of the terminal MS_A as indicated with ④.

Upon the request, the GLR_A 19a requests location register about the terminal MS_A and the packet and line subscriber information also to the HLR_A1 16a, to which the terminal MS_A belongs as indicated with ⑤, and when the response thereabout is transmitted, stores the transmitted packet and line subscriber information in an area H of the GLR_A as indicated with ⑥, and then transmits the same to the GLR_B 19 as indicated with ⑦.

Then, after storing the packet and line subscriber information about the corresponding terminal MS_A in the area A, the GLR_B 19 transmits the same to VLR_B1 as indicated with ⑧ so that the packet and line subscriber information about the corresponding terminal MS_A is stored in the VLR_B1.

Hereinafter, the registration process of the packet and line subscriber information illustrated in FIG. 3 will be described in more detail in reference to FIG. 4.

Figure 3:
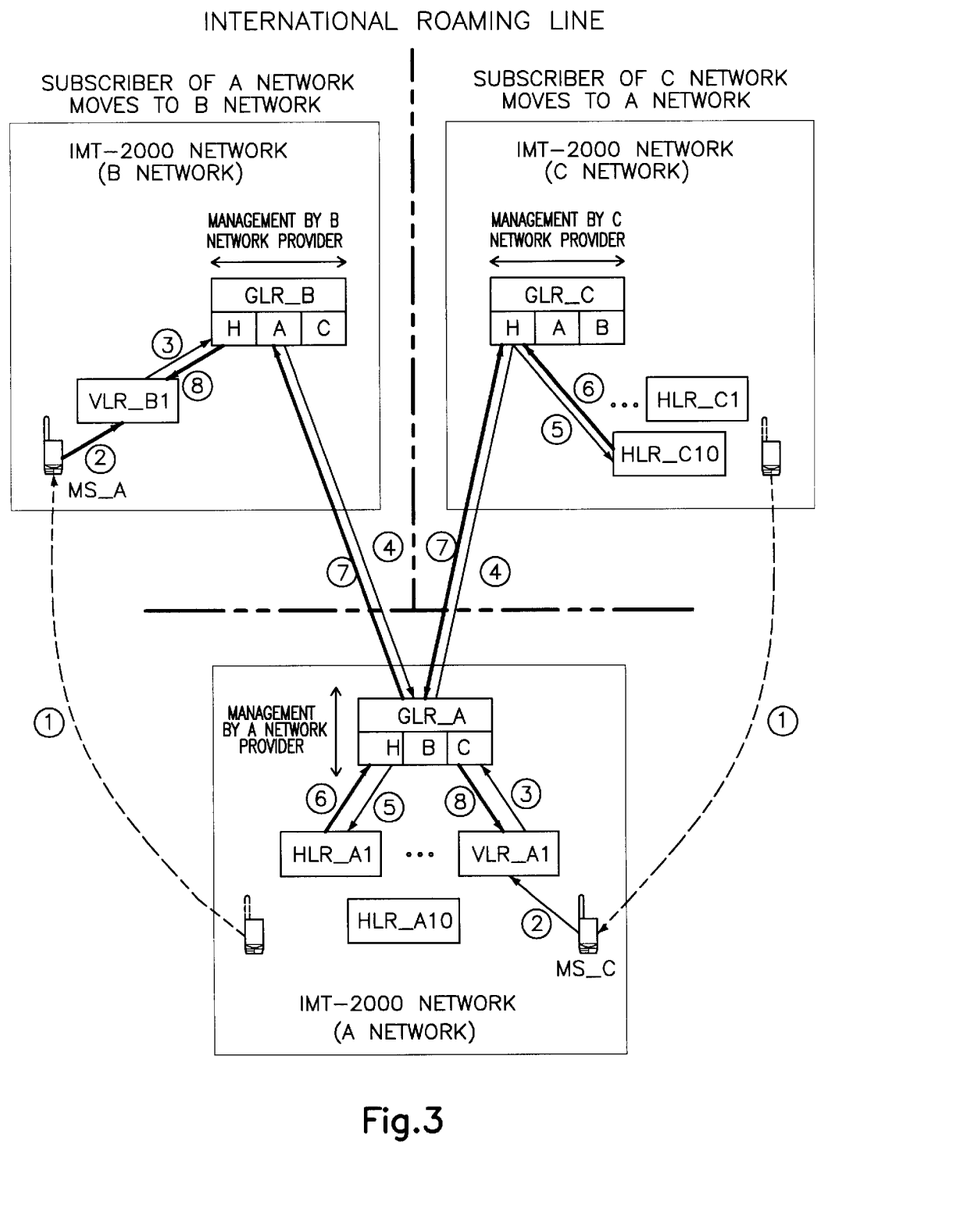
FIG. 3 shows a signal flow of roaming services for global roaming subscribers according to an embodiment of the invention.
Figure 4:
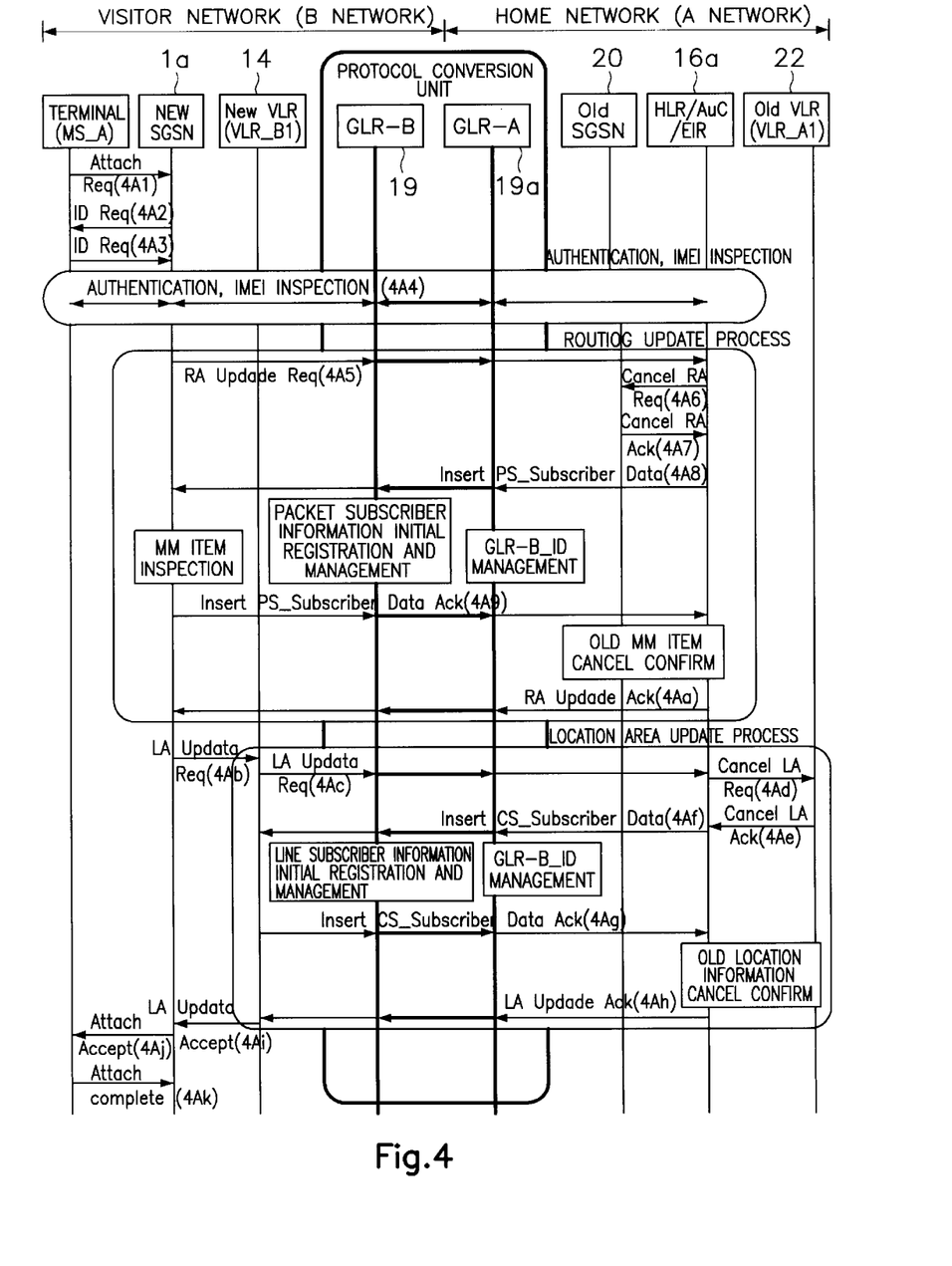
FIG. 4 shows a message flow for illustrating a method of roaming services for global roaming subscribers according to an embodiment of the invention.

After roamed to the visitor network B, the terminal MS_A transmits an attach request message 4A1, i.e., the location register message illustrated in FIG. 3 to the SGSN 1a of the visitor network. The message includes P_TMSI (Packet_Temporary Mobile Subscriber ID) or TMSI (Temporary Mobile Subscriber ID), P_TMSI source ID or TMSI source ID, terminal ability, old RAI(Routing Area ID), old LAI(Local Area ID), attach type, etc.

Here in the embodiment of the invention, the attach type is set as a combined GPRS/IMSI attach type as an example.

The SGSN 1a inspects the P_TMSI source ID(old SGSN ID) or TMSI source ID(old VLR ID) to confirm if the P_TMSI (i.e., temporary third generation mobile telecommunication subscriber number related to the packet allocated in the SGSN) or TMSI (i.e., temporary third generation mobile telecommunication subscriber number related to the circuit allocated in the VLR) is the number allocated in the SGSN or VLR of the current visitor network B. The SGSN 1a recognizes the terminal as a global roamed terminal if the P_TMSI source ID(old SGSN ID) is not registered in the visitor network B, and transmits an IMSI request message 4A2 for obtaining the IMSI to the terminal MS_A.

Upon receiving a response message including the IMSI in respect to the request, the IMSI values obtained via the foregoing processes are transmitted to the SGSN 1a as included in an authentication request message so that the roamed terminal MS_A related information can be stored in the SGSN 1a.

After that, when the SGSN 1a transmits the authentication request message from the terminal MS_A to the GLR_B 19, the GLR_B 19 stores the IMSI values in the area A and analyzes the home network of the terminal MS_A by using the MCC from the IMSI parameters included in the authentication request message as well. Then, when a passage is set between the GLR_B 19 GLR_A 19a of the home network A, an authentication process is carried out between the terminal MS_A and an AuC, and an IMEI(Third generation Mobile Equipment Identity) verification process is optionally performed between the terminal MS_A and an EIR as indicated with 4A4.

Also, these authentication parameters and IMEI values can be included in a packet routing area update message as described hereinafter so that the authentication and IMEI verification processes can be performed at the same time with a packet routing area updating process.

Again, when the authentication process is completed, the SGSN 1a transmits the packet routing area update message 4A5 including the parameters about the IMSI values, SGSN number, SGSN address, etc. to the GLR_B 19. The GLR_B 19 stores the IMSI values, SGSN number, SGSN address, etc. included in the packet routing area update message 4A5, and performs an address conversion to include the GLR_B ID and address in the packet routing area update message.

The GLR_B 19 determines whether a protocol conversion is provided or not, and then transmits the packet routing area update message 4A5 to the GLR_A 19a of the home network.

Then, the GLR_A 19a stores the GLR_B ID in "H" area, and transmits the packet routing area update message to the HLR_A1 16a where the terminal MS_A is registered.

Upon receiving the packet routing area update message 4A5, the HLR_A 16a transmits a routing cancel request signal 4A6 including parameters about IMSI values, cancel type, etc. to the SGSN 20 of the home network. The SGSN 20 cancels routing information corresponding to the IMSI values, and then transmits a routing cancel confirm signal 4A7 to the HLR 16a.

Then, the HLR_A 16a stores the GLR_A 19a ID and the number and address of the SGSN 1a of the visitor network at the same time, and then transmits the packet subscriber information transmission message 4A8 about the terminal MS_A. The GLR_A 19a stores only the GLR_B ID and address in "H" area, and then transmits the corresponding packet subscriber information message 4A8 to the GLR_B 19.

Here, the packet subscriber information transmission message 4A8 is comprised of the IMSI value parameters and GPRS(General Packet Radio Service) subscriber data, etc., which are profile information about packet services to which the subscriber is registered.

Again, the GLR_B 19 processes first registration about the transmitted packet subscriber information, transmits the corresponding packet subscriber information transmission message 4A8 to the SGSN 1a. Upon receiving the packet subscriber information, the SGSN 1a inspects an MM(Mobility Management) item, and then transmits a packet subscriber information transmission acknowledgement message 4A9 to the GLR_B 19.

Here, the MM item is for packet information transmission and includes P_TMSI, old RAI, terminal radio access ability, P_TMSI signature, GPRS timer, etc. for example.

Then, when the GLR_B 19 performs packet subscriber information management and confirmation about the terminal MS_A and at the same time transmits the packet subscriber information transmission acknowledgement message to the GLR_A 19a, the GLR_A 19a performs management and confirmation about ID and address of the GLR_B 19 and at the same time transmits the packet subscriber information transmission acknowledgement message 4A9 to the HLR 16a of the home network.

Then, the HLR 16a cancels the MM item stored in the SGSN 20 of the home network, and then transmits a routing area update acknowledgement signal to the SGSN 1*a* via the GLR_A 19*a* and GLR_B 19.

The SGSN 1*a* analyzes the attach type of the attach request message 4A1 from the terminal MS_A, and when the attach type is a packet/line combined type, transmits the location area update request signal 4A*b* to the VLR_B1 14 of the visitor network to perform a circuit location area update process. The process will be described as location area update process in the case of the circuit for the sake of brevity.

The location area update request signal 4A*b* is transmitted to the HLR 16*a* of the home network via the VLR_B1, GLR_B 19 and GLR_A 19*a*. The HLR 16*a* transmits the location information cancel request signal about the terminal MS_A to the VLR_A1 22 of the home network. The VLR_A1 22 cancels the location information about the terminal MS_A, and then transmits a location information cancel acknowledgement signal 4A*e*. Then, a line subscriber information transmission message 4A*f* is transmitted to the VLR_B1 14 of the visitor network via the GLR_A 19*a* and GLR_B 19.

Here, the GLR_A 19*a* stores ID of the GLR_B 19, and the GLR_B 19 performs the initial register process of the line subscriber information about the terminal MS_A, and then performs management about the terminal MS_A.

Meanwhile, the VLR_B1 14 transmits a line subscriber information transmission acknowledgement signal 4A*g* to the HLR 16*a* of the home network via the GLR_B 19 and GLR_A 19*a*. The HLR 16*a* confirms that the location information about the MS_A is canceled from the VLR_A1 22 of the home network, and then transmits a location area update acknowledgement signal 4A*f* to the VLR_B1 14 of the GLR_A 19*a* and GLR_B 19.

Then, when the VLR_B1 14 transmits a location area update approval signal 4A*i* to the SGSN 1*a*, the SGSN 1*a* an attach approval signal 4A*j* to the terminal MS_A. Accordingly, when an attach complete signal 4A*k* is received in the SGSN 1*a* from the terminal MS_A, the foregoing routing area updating and location area updating processes for providing the roaming service to the global roaming subscriber are terminated.

According to the foregoing processes, the packet and line subscriber information stored in the HLR 16*a* of the home network about the roamed terminal MS_A is stored in the VLR_B1 14 of the visitor network via the GLR_A 19*a* of the home network and the GLR 19 of the visitor network, and then a call service about the roamed terminal MS_A is provided in the visitor network based upon the information stored in the VLR_B1 14.

Figure 5:
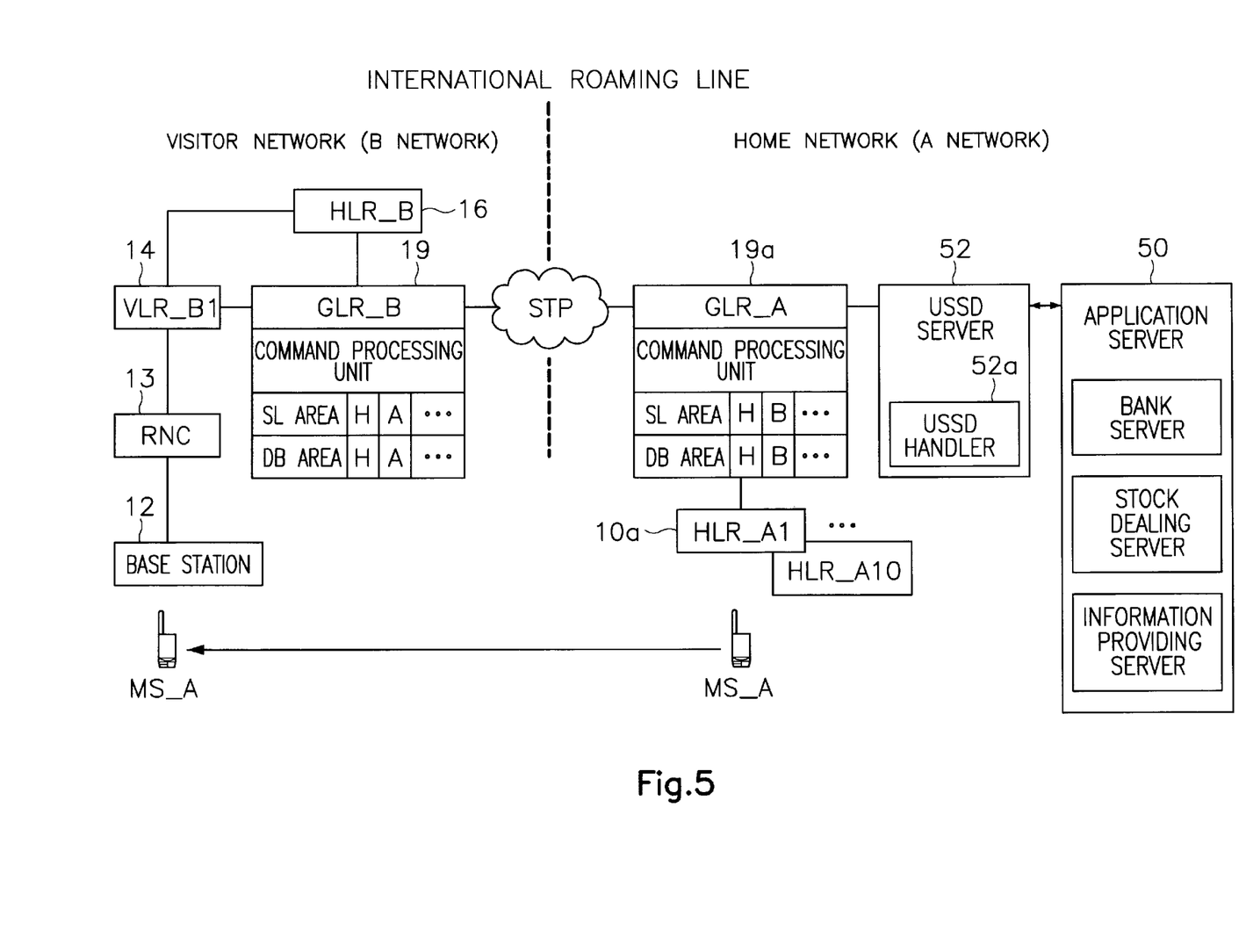
FIG. 5 is a schematic block diagram of an apparatus applied with a method of roaming services for global roaming subscribers in third generation mobile telecommunication networks according to an embodiment of the invention.

FIG. 5 is a schematic block diagram of an apparatus applied with a method of roaming services such as additional service information changing and a USSD handler downloading for global roaming subscribers in the third generation mobile telecommunication networks according to an embodiment of the invention.

In FIG. 5, description of reference numerals having same functions as FIG. 1 is omitted.

In FIG. 5, the GLR_A 19*a* and GLR_B 19 installed in each network have a command processing unit for receiving an MMI(Man Machine Interface) command code from the terminal to analyze and process the same, an SL area or service logic area for having download of specific additional service and application service logics such as the USSD handler, and a DB area or database area for having download of information about local subscribers who left for the other networks or visitor networks from the home network and foreign subscribers who roamed from other networks.

In particular, the service logic area and database area have separated data storage area so that the information on the local and foreign subscribers can be saved as discriminated.

In the invention, the GLR_A 19*a* and GLR_B 19 causes the USSD handler 52*a* of a USSD server 52 in the home network to be save in "A" area in the SL area, changes and stores the additional service information about the terminal MS_A stored in the HLR_A1 16*a* of the GLR_A 19*a* of the home network when change is required about the additional service information by the terminal MS_A, and then performs a series of control processes for storing the changed information into the MSC/VLR 14 of the visitor network.

Also, the third generation mobile telecommunication network has an application server 50 for providing information service, bank service and stock dealing service and the USSD(Unstructured Supplementary Service Data) server 52, which is connected to the application server and allows information to be outputted from a bank service server, stock dealing service server and information providing server, and in which various services are provided from the application server 50 to be used via the terminal.

Here, the USSD server 52 has the USSD handler 52*a*, which performs an interface function between the application server 50 and the HLR_A1 16*a*, and reads the location information of the terminal from the HLR_A1 16*a* so that information provided to the terminal MS_A from the application server 50 can be outputted via the terminal.

Figure 6:
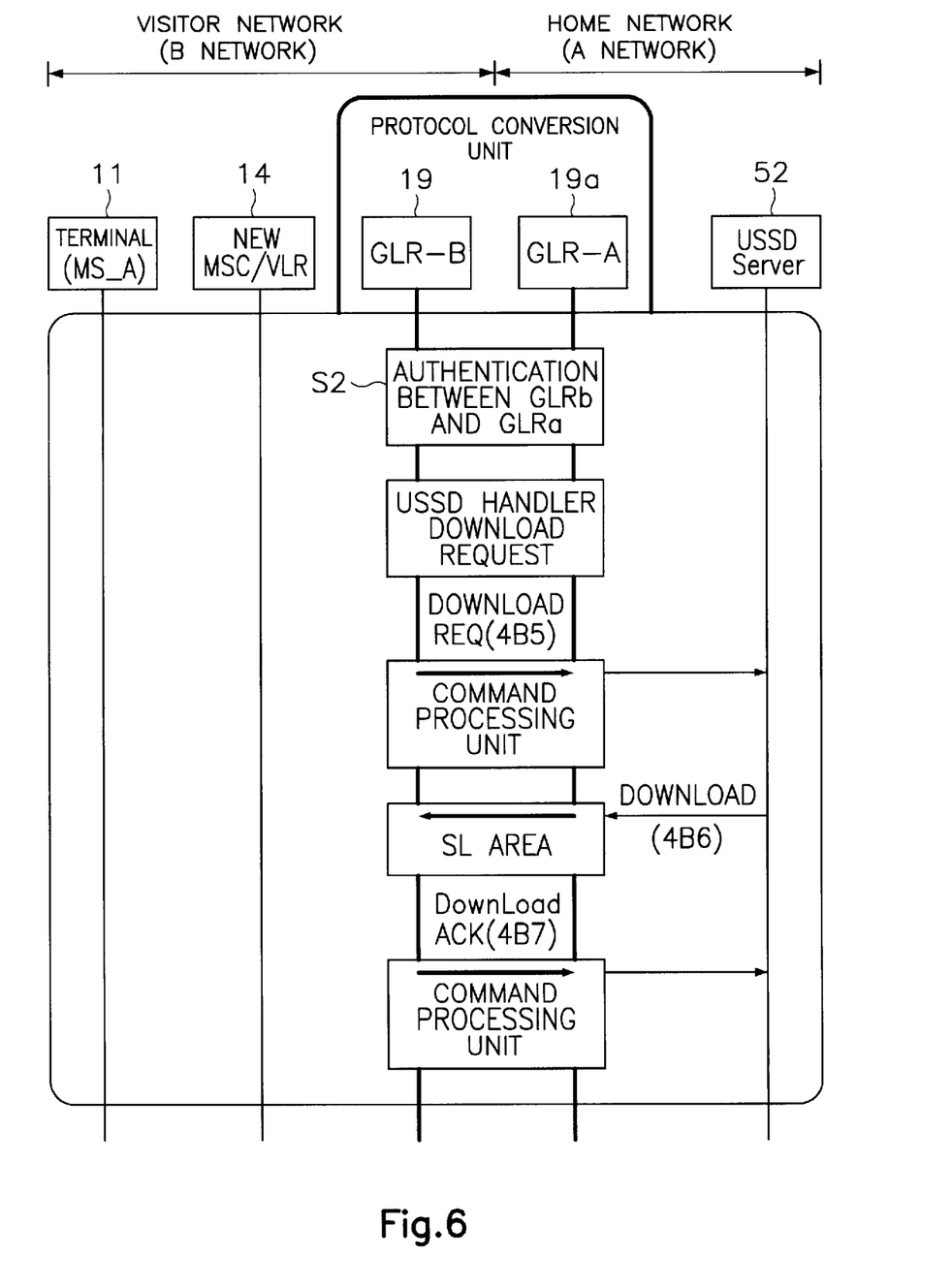
FIG. 6 shows a message flow for illustrating a method of changing additional service information applied in roaming services for global roaming subscribers according to an embodiment of the invention.

Hereinafter, a process of storing the USSD handler 52*a* in the USSD server 52 of the home network to the GLR_B 19 of the visitor network is described in detail referring to a message flow shown in FIG. 6.

After an authentication process between the GLR_B 19 and GLR_A 19*a* connected via a signaling network or an STP, when a command processing unit of the GLR_B 19 transmits a USSD handler down request message 4B5 to a command processing unit of the GLR_A 19*a*, the GLR_A 19*a* transmits the corresponding USSD handler down request message 4B5 to the USSD server 52.

Accordingly, when the USSD server 52 downloads the USSD handler 52*a* to the GLR_A 19*a* as indicated with 4B6, the GLR_A 19*a* stores the downloaded USSD handler 52*a* to "H" area of the SL area, and then downloads the same to the GLR_B 19.

Then, after storing the downloaded USSD handler 52*a* to "A" area of the SL area, the GLR_B 19 transmits a download confirm message 4B7 to the command processing unit of the GLR_A 19*a* of the network. The GLR_A 19*a* transmits the download confirm message 4B7 to the USSD server 52.

Again, the GLR_B 19 stores the USSD handler 52*a* to the MSC 14 so that the terminal MS_A can be transmitted with data provided from the bank service server via the MSC 14 in the case of using the bank service for example provided from the application server 50.

Figure 7:
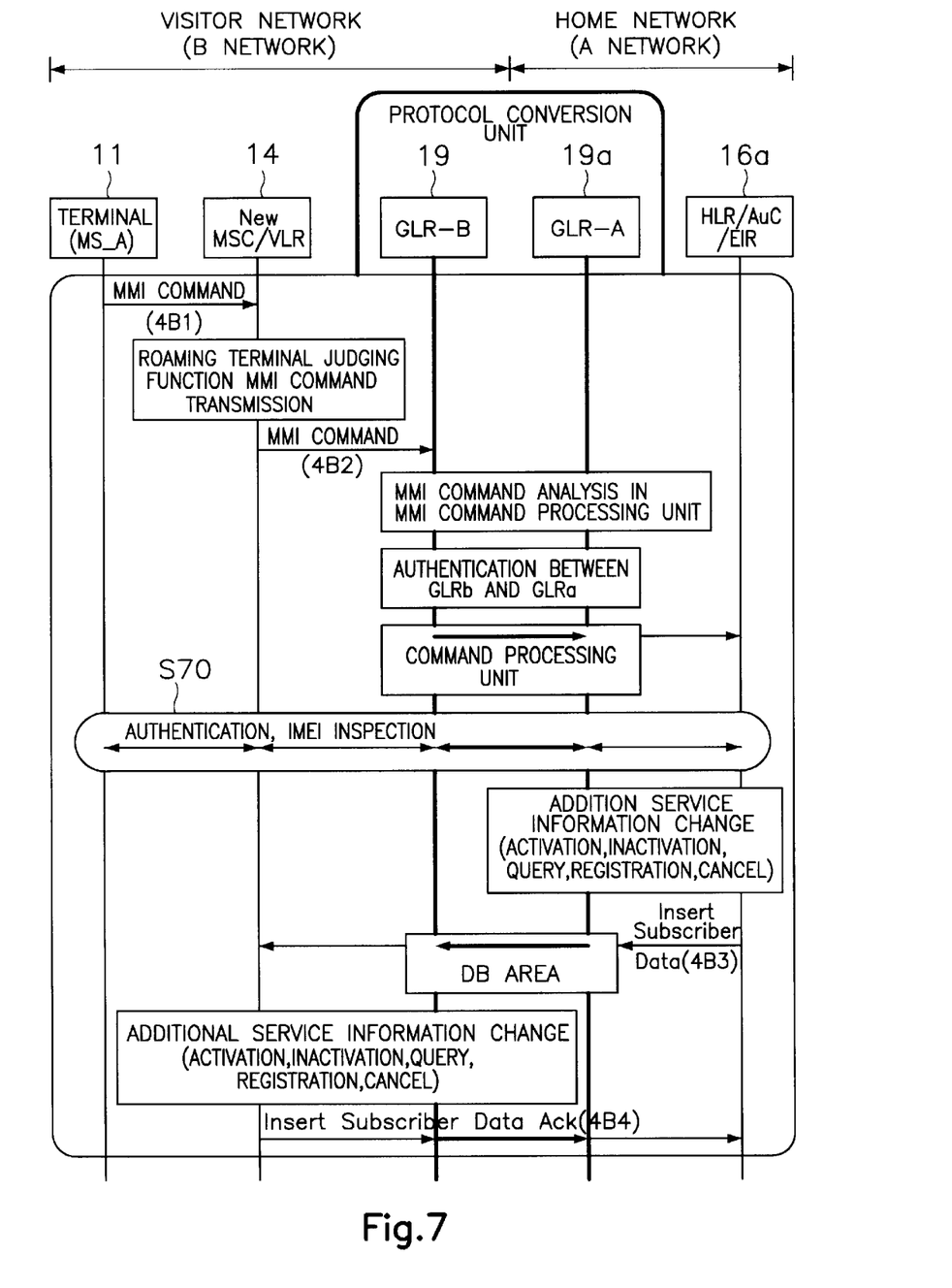
FIG. 7 shows a message flow for illustrating a method of downloading a USSD handler applied in roaming services for global roaming subscribers according to an embodiment of the invention.

Hereinafter, an additional information changing method by using the method of roaming services for global roaming subscribers in the third generation mobile telecommunication network according to the embodiment of the invention will be described in detail referring to a message flow in FIG. 7.

When the MMI command for changing the additional service information inputted via the terminal MS_A is transmitted to the MSC/VLR 14 via the RNC 13, the MSC/VLR 14 judges that the terminal MS_A is roamed via the IMSI value, service code and additional service information included in the MMI command, and then transmits the corresponding MMI command to the command processing unit as indicated with 4B2.

Accordingly, after the GLR_B 19 analyzes the service code and additional service information included in the MMI command, an authentication is performed between the GLR_B 19 and GLR_A 19a.

Then, the GLR_B 19 transmits the MMI command to the command processing unit of the GLR_A 19a. and the GLR_A 19a transmits the MMI command to the HLR 16a of the home network.

Then, an authentication is performed on the terminal in the AuC as indicated with S70. Upon completing the authentication, the HLR 16a changes the additional service information into several states including activation, inactivation, query, registration, cancel, etc. based upon the SC and SI included in the MMI command.

After that, the HLR 16a stores the changed additional service information in "H" area of the database area of the GLR_A 19a, the GLR_A 19a stores the additional service information stored in "H" area into "A" area of the database area of the GLR_B 19 of the visitor network.

Accordingly, the GLR_B 19 stores the additional service information changed as activation, inactivation, query, registration, cancel, etc. into the VLR 14.

Upon later receiving the MMI command for using the additional service from the terminal MS_A, the VLR 14 provides the corresponding additional service to the terminal MS_A only in the case that the activated additional service is requested via the terminal MS_A by checking if the requested additional service is activated for the user.

Again, the VLR 14 which stored the changed additional service information transmits an additional service change acknowledgement signal to the HLR 16a of the home network via the GLR_B 19 and GLR_A 19a as indicated with 4B4.

When the terminal roamed to the visitor network requests the additional service information change via the foregoing series of processes, the additional service information stored in the HLR of the home network in which the terminal is registered is changed, and then the changed additional service information is transmitted to the VLR of the visitor network from the HLR to be stored into the VLR so that the user of the roamed terminal can conveniently use the additional service in the visitor network as well.

Also, while the invention is described about the storing process of the service profile about stored in the HLR of the home network or changing process of the information stored in the profile, a service logic for intelligent service provided in the home network can be stored in the "SL" area of the GLR of the visitor network so that the intelligent network service can be provided by using the service logic when the intelligent network service is requested from the roamed terminal.

According to the invention as described hereinabove, the visitor network GLR is blocked from direct contact to the home network HLR in the roaming service about the terminal moved to other network and is downloaded with the subscriber information stored in the home network HLR in which the terminal is registered via the GLR so that the subscriber information stored in the home network HLR can be prevented from exposure by the visitor network GLR.

Also, since the visitor network GLR is required to detect the home network GLR only in the first roaming to the visitor network, a detecting process for the HLR storing the subscriber information of the roamed terminal is unnecessary.

Furthermore, the message is transmitted/received as converted into the home network GLR protocol from the visitor network GLR so that a troublesome process of providing in the home network HLR the MAP conversion function can be avoided.

It is to be understood that the aforementioned description is illustrative only and that changes and modification can be made in the apparatus as well as in other aspects of the invention discussed herein without departing from the scope of the invention as defined in the following claims.

What is claimed is:

1. A method of providing roaming services for global roaming subscribers in third generation mobile telecommunication networks having a GLR(Gateway Location Register), HLR(Home network Location Register) and VLR (Visitor Location Register) in which the GLR and VLR are stored with subscriber information about a terminal, which is roamed from the home network to a visitor network, to provide the roamed terminal with same services in the visitor network as in the home network, the method comprising:

transmitting location register information from the roamed terminal to the GLR of the visitor network;

requesting by the GLR of the visitor network for the location register information to be downloaded to the HLR of the home network via the GLR of the home network;

transmitting subscriber information stored in the HLR of the home network, to the GLR of the home network;

transmitting the subscriber information from the GLR of the home network to the GLR of the visitor network; and managing of the roamed terminal by the GLR of the visitor network based on the subscriber information.

2. The method of providing roaming services in accordance with claim 1, wherein the location register information includes parameters IMSI value, ID of the terminal, terminal ability, final RAI, final LAI and attach type.

3. The method of providing roaming services in accordance with claim 2, wherein the GLR of the visitor network transmits a routing area update message to request the location register and the GLR of the visitor network is downloaded with packet subscriber information stored in the HLR of home network when the attach type included in the location register message is packet type.

4. The method of providing roaming services in accordance with claim 2, wherein the GLR of the visitor network transmits location area update message to request the location register and the GLR of the visitor network is downloaded with line subscriber information stored in the HLR of the home network when the attach type included in the location register message is line type.

5. The method of providing roaming services in accordance with claim 2, wherein the GLR of the visitor network transmits a routing area update message to request the location register and the GLR of the visitor network is downloaded with packet subscriber information stored in the HLR of home network and then the GLR of the visitor network transmits a location area update message to request the location register and the GLR of the visitor network is downloaded with line subscriber information stored in the HLR of home network, when the attach type included in the location register message is packet/line combined type.

6. The method of providing roaming services in accordance with claim 1, wherein the GLR of the home network detects the HLR of the home network where the terminal is registered based upon an IMSI value included in the location register message, and then requests the HLR of the home network to transmit a subscriber information.

7. The method of providing roaming services in accordance with claim 1, the GLR of the visitor network and the GLR of the home network have a local subscriber database for storing subscriber information about a local terminal which is visiting other network and a roaming subscriber database for storing subscriber information about a roaming terminal moved from other network, wherein the GLR of the home network stores the subscriber information transmitted from the HLR to the local subscriber database, and the GLR of the visitor network stores the subscriber information transmitted from the GLR of the home network to the roaming subscriber database.

8. The method of providing roaming services in accordance with claim 1, wherein the GLR of the home network stores ID and address about the GLR of the visitor network to manage the terminal provided with the roaming service in other network.

9. The method of providing roaming services in accordance with claim 1, wherein the subscriber information is packet subscriber information or line subscriber information about the roamed terminal.

10. The method of providing roaming services in accordance with claim 1, wherein the GLR of the visitor network detects the GLR of the home network for managing the roamed terminal based upon telephone number given to the terminal.

11. The method of providing roaming services in accordance with claim 1, wherein the GLR of the visitor network transmits a routing area update message to request the location register and the GLR of the visitor network is downloaded with packet subscriber information stored in the HLR of the home network when the attach type included in the location register message is packet type.

12. The method of providing roaming services in accordance with claim 1, wherein the GLR of the visitor network transmits location area update message to request the location register and the GLR of the visitor network is downloaded with line subscriber information stored in the HLR of the home network when the attach type included in the location register message is line type.

13. The method of providing roaming services in accordance with claim 1, wherein the GLR of the visitor network transmits a routing area update message to request the location register and the GLR of the visitor network is downloaded with packet subscriber information stored in the HLR of home network and then the GLR of the visitor network transmits a location area update message to request the location register and the GLR of the visitor network is downloaded with line subscriber information stored in the HLR of home network, when the attach type included in the location register message is packet/line combined type.

14. A method of providing roaming services for global roaming subscribers in third generation mobile telecommunication networks having a GLR, HLR and VLR in which the GLR and VLR are stored with subscriber information about a terminal, which is roamed from the home network to a visitor network, to provide the roamed terminal with same services in the visitor network as in the home network, said method comprising the steps of:

inputting in the roaming completed terminal an MMI command according to additional service changes to transmit the command via the GLR of the visitor network to the GLR of the home network;

changing in the GLR of the home network additional service information stored in the HLR of the home network in response to the MMI command;

transmitting in the HLR of the home network the changed additional service information to the GLR of the home network;

storing in the GLR of the home network and transmitting the additional service information to the GLR of the visitor network; and storing in the GLR of the visitor network and transmitting the additional service information to the VLR where the roamed terminal is currently registered, whereby the roamed terminal can change the additional service information stored in the HLR of the home network.

15. A method of providing roaming services in accordance with claim 14, wherein the GLR of the visitor network and GLR of the home network have a local subscriber database for storing additional service information about a local terminal which is visiting other network and a roaming subscriber database for storing subscriber information about a roaming terminal moved from other network, wherein the GLR of the home network stores the additional service information transmitted from the HLR to the local subscriber database, and the GLR of the visitor network stores the additional service information transmitted from the GLR of the home network to the roaming subscriber database.

16. A method of roaming services for global roaming subscribers in third generation mobile telecommunication networks having a GLR, HLR and VLR in which the GLR and VLR are stored with subscriber information about a terminal, which is roamed from the home network to a visitor network, to provide the roamed terminal with same services in the visitor network as in the home network, the method comprising:

transmitting programs for supporting application services or intelligent network services from the HLR of the home network to the GLR of the home network;

transmitting the programs from the GLR of the home network to the GLR of the visitor network; and providing the application services or the intelligent services by the GLR of the visitor network to the roamed terminal by using the downloaded programs.

* * * * *